No. 621,796. Patented Mar. 28, 1899.
A. COLLETTE & A. BOIDIN.
MANUFACTURE OF ALCOHOL.
(Application filed Oct. 5, 1897.)
(No Model.)
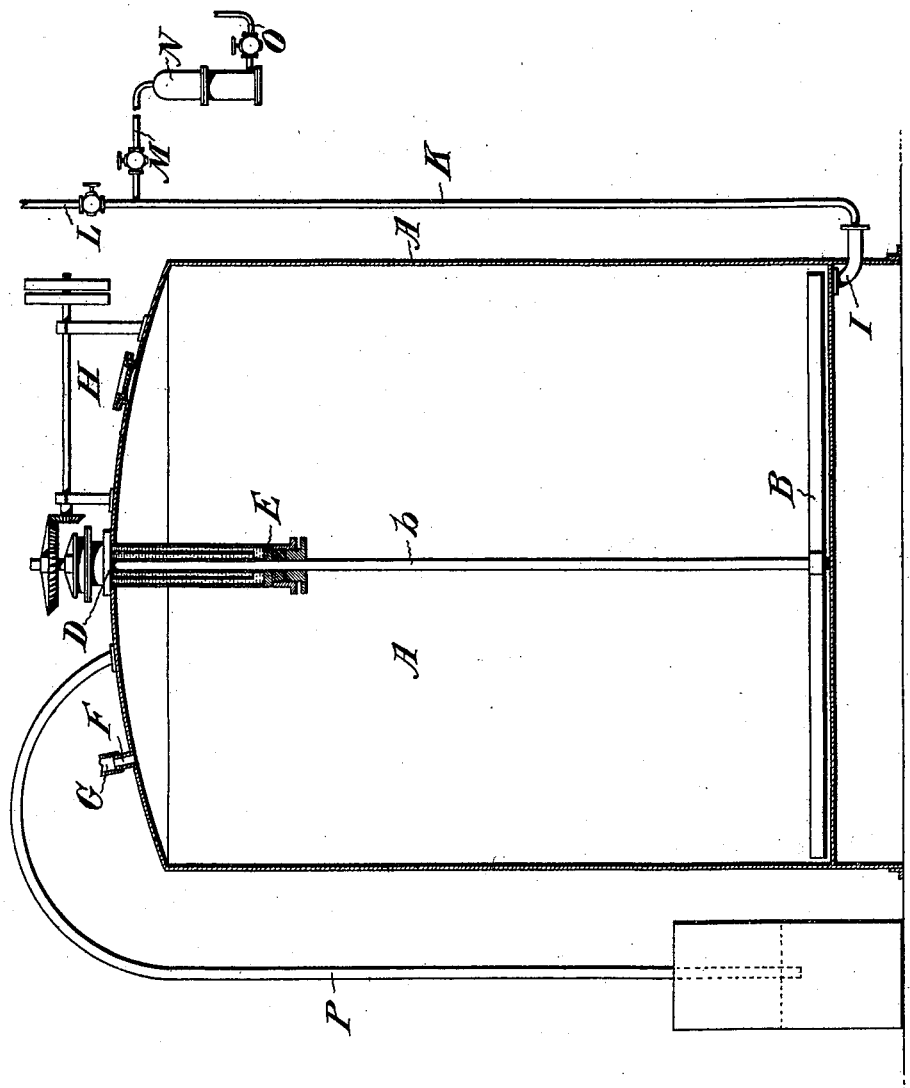

UNITED STATES PATENT OFFICE.

AUGUSTE COLLETTE AND AUGUSTE BOIDIN, OF SECLIN, FRANCE.

MANUFACTURE OF ALCOHOL.

SPECIFICATION forming part of Letters Patent No. 621,796, dated March 28, 1899.

Application filed October 5, 1897. Serial No. 654,160. (No specimens.)

*To all whom it may concern:*

Be it known that we, AUGUSTE COLLETTE and AUGUSTE BOIDIN, citizens of France, residing at Seclin, France, have invented certain new and useful Improvements in the Manufacture of Alcohol, (for which Letters Patent have been obtained in France, dated June 28, 1897, No. 265,245;) and we do hereby declare the following to be a full, clear, and exact description of the invention, such as will enable others skilled in the art to which it appertains to make and use the same, reference being had to the accompanying drawings, and to letters of reference marked thereon, which form a part of this specification.

In the manufacture of alcohol or spirits from cereals the actual yield in alcohol, as is well known, is from twenty per cent. to twenty-five per cent. or more below the theoretical yield. Thus, for instance, from one hundred kilos of starch, which should yield 67.888 liters of alcohol of 100°, but fifty liters are obtained by the so-called "acid" process and fifty-eight to sixty liters by the so-called "malt" process, while, as is well known, and according to the researches of Dr. Calmette, (*Annales de l'Institut Pasteur*, Paris, 1892, pages 604 *et seq.*,) the yield by the so-called "Chinese" process is but thirty-six liters. As determined by Dr. Calmette and others, as well as by ourselves, this loss in alcohol is justly attributable to the intrusion of micro-organisms or parasites during saccharification and fermentation, (hitherto generally carried out in the presence of atmospheric air,) which seriously interfere with and in certain instances completely arrest the conversion of the starch into sugar and the latter into alcohol. As a remedy for this evil Dr. Effront proposed the use of hydrofluoric acid as an aseptic, this acid having but a slight deleterious action upon alcoholic ferments, while it has a destructive action upon the micro-organisms referred to. In certain cases this process has proved beneficial and the yield in alcohol has been somewhat increased, though the yield was still far below the theoretical yield.

From our knowledge of the art to which this invention pertains we became fully satisfied that the losses in alcohol which occur in the manufacture of alcohol from grain by the processes hitherto practiced are due solely to the imperfect saccharification or the imperfect fermentation, or both, of the starch and that this is due, on the one hand, to the use of insufficiently powerful or active saccharifying and fermenting agents and, as stated, to the intrusion of micro-organisms which interfere with the saccharification and fermentation of the starch.

Irrespective of the low yield there is in the manufacture of alcohol from grain as hitherto practiced more or less uncertainty as to the results to be obtained unless great care is had, while the cost involved is comparatively high. Thus, for instance, in the so-called "malt" process not only a large quantity of yeast is required, which involves losses in alcohol, due to the formation of lactic acid and to incomplete saccharification of the starch and fermentation of the sugar, but large quantities of malt are necessary, the preparation of which involves losses in starch, due to germination. The malt, on the other hand, acts also as a means of propagating the deleterious micro-organisms above referred to, it being an efficient medium for their propagation, and is always infested thereby or covered therewith, and they are thus introduced into the mash or wort.

In the so-called "acid" process comparatively large quantities of acid are required, the action of which leads to the caramelization of the sugar and consequent loss of glucose. Furthermore, a comparatively large proportion of the non-fermentable constituents of the grain are dissolved by the powerful action of the acid, thereby impoverishing the solid residues or swill in nourishing constituents.

In view of what has been said above it is not necessary to more fully discuss the disadvantages inherent to the so-called "Chinese" process, the low yield in alcohol alone rendering this process unavailable.

We have been fully aware of the fermenting properties of certain microscopical fungi, pathogenic and non-pathogenic, and we have also been aware that certain species of these fungi possess not only fermenting but also saccharifying properties—as, for instance, the *Aspergillus orizæ*, (Ahlburg,) the *Mucor alternans*, (Gayon,) and other microscopical fungi, which possess these properties to a greater or less degree; but Dr. Calmette has succeeded in isolating from the Chinese yeast a microscopical fungus whose saccharifying and fermenting properties are far greater than those of any other micro-organism before known, and which he named "*Amylomices Rouxii*," as fully described in the *Annales de l'Institut Pasteur* above referred to.

With our knowledge of the causes that have hitherto prevented the distiller from increasing the yield in alcohol to, or approximately to, the theoretical yield we were induced to experiment with these *Mucedineæ*, and also to devise means whereby the intrusion of micro-organisms that tend to interfere with the saccharification and fermentation of the starch could be effectually prevented. These experiments proved conclusively that our theories were correct, in that the substantially complete conversion of the starch into sugar and alcohol could be effected by the direct propagation of these *Mucedineæ* in the mash or liquor, and that the growth of deleterious micro-organisms could be effectually prevented by effecting the saccharification and fermentation in an ascepticized medium, or, in other words, by saccharifying and fermenting the mash or liquor while in a thoroughly sterilized condition and preventing during these operations the intrusion of adventitious micro-organisms. We were also well aware that the starch in the boiling or cooking of grain for distillation is liable to agglomerate in lumps and apt to precipitate in masses in the saccharifying and fermenting vessel. We became convinced by our experiments that even the *Mucedineæ* will not completely convert starch agglomerated in large lumps or when precipitated in considerable masses into sugar, and that here also was a source of loss in alcohol unless energetic means were provided to maintain the starch fluidified. This difficulty we have likewise overcome, so that by our process we are enabled to obtain from one thousand kilos of Indian corn, for instance, containing sixty per cent of starch, four hundred liters of alcohol of 100°, or a yield of 66.6 liters of alcohol per one hundred kilos of starch, the yield being within a small fraction of the theoretical yield, a result never attained before our invention.

We are aware that before our invention it has been proposed to saccharify and ferment a mash or wort prepared from grain by means of specially-prepared diastases and ferments in which microscopic fungi, such as the *Eurotium orizæ* and the genera *Mucor* and *Penecillium*, constituted the active agents. The preparation of these diastases and ferments requires not only a great deal of time, care, and labor, but is expensive, and they constitute in themselves the best soil, if we may so express ourselves, for the culture and propagation of the injurious micro-organisms referred to, which are always present in said diastases and ferments and are thus introduced into the mash or wort, and as the proportion of alcohol obtained is not much greater than that obtained by the usual processes, if in fact the yield in alcohol is increased at all over and above the usual yield, this must be attributed to the presence of these injurious micro-organisms. In contradistinction to this and every other method or process of saccharifying and fermenting a mash or wort prepared from grain we effect the saccharification and fermentation by the direct action of nonpathogenic *Mucedineæ* by propagating the same in the mash or wort itself, and not only this, but we prevent the intrusion of injurious micro-organisms by first sterilizing the mash or wort and then saccharifying and fermenting the same in presence of sterilized air only, thus preventing the growth in the mash of adventitious micro-organisms which before our invention have been the primary cause in loss of alcohol. In our exhaustive experiments we have also discovered that the saccharification and fermentation can be materially expedited by addition to the mash or wort at a certain stage of a small quantity of a pure ferment or ferment culture other than *Mucedineæ*—as, for instance, pure yeast—and that the starch can be kept in a perfectly-fluid condition by means other than those hitherto resorted to. This we can accomplish in two ways.

First, by acidification—that is to say, by the addition to the mash of a small quantity of an organic or inorganic acid, preferably hydrochloric acid. When we speak of a small quantity of acid, we mean small as compared with the quantity of acid used in the so-called "acid" process. Thus, for instance, in the latter process five per centum of acid, by weight, is used in the saccharification of the mash or mash liquor when the operation is effected under pressure and ten per centum when the operation is effected in an open vessel. We, on the contrary, require only from one to two parts of acid to every one thousand parts of the grain or mash in our process of fluidification, this quantity of acid being added to the grain while being cooked under pressure or in an open vessel, and when properly mixed further stirring can be dispensed with. After the mash is prepared the acid is neutralized by means of any suitable base.

Secondly, the fluidification of the starch can be effected by the addition to the boiling grain of a small quantity of malt. Here also when we speak of a small quantity of malt we mean small as compared with the quantities used in the so-called "malt" process of saccharification, wherein about fifteen per cent. of malt is required, while in our process of fluidification we require somewhat less than one per centum. The liquefying action of malt upon starch we have found to be much greater than that of acids, so that the very small quantity of malt used by us has been found sufficient for the purposes in view. The action of the malt upon the starch will be the same whether the cooking is effected under pressure or in an open boiler; but that our invention may be fully understood we will now describe the same specifically.

A mash is prepared from one thousand kilos of Indian corn, for instance, containing, say, sixty per cent. of starch, with two thousand kilos of water by cooking in any usual or preferred manner. The mash is then fluidified and attenuated to the required consistency or density suitable for distillation by transferring the same into a suitable vessel provided with the necessary stirring apparatus and containing about forty-five hectoliters water holding about five kilos green ground malt in suspension, the whole being thoroughly mixed. This operation completed, the mash will have cooled down to about 70° to 71° centigrade, while the starch which entered the fluidifying vessel in a precipitable condition will have been converted into a soluble condition, so to speak, and will be held in solution in the mixture. The mixture or attenuated and fluidified mash is now thoroughly sterilized by heating the same to about 120° centigrade for about twenty minutes in a suitable closed digester, from which the sterilized mash is mechanically transferred by pumping or siphonage to the saccharifying and fermenting vessel, the transferring appliances, as well as the said vessel, having been previously sterilized by heat. This may, however, be dispensed with by boiling the mash in the saccharifying and fermenting vessel for about an hour by means of steam introduced into the vessel, so as to insure thorough sterilization not only of the mash, but of the vessel and its connections. This done, sterilized air is admitted to and through the mash until it has cooled down to from about 35° to 38° centigrade, after which it is sown with *Mucedineæ*, or the mash may be cooled in any other manner.

In practice and owing to the fact that but a very small quantity of the *Mucedineæ* is required to effect the saccharification and fermentation of the mash or wort—in fact, so small as to render it difficult of dosing—we preferably prepare a culture as follows: We sow into one-half a liter thoroughly-sterilized beer-wort, under the precautions usually taken in bacteriology, a mere trace of a perfectly-pure *Mucedineæ*, preferably the *Amylomiceæ Rouxii*, a few days previous to the sowing of the mash. When the spores or seeds have developed, the mycelian cells or tubes formed are disaggregated by agitation, after which the culture is sown into the mash or wort. Sterilized air is now blown through the mash and the agitation thereof kept up to keep the new growth of the *Mucedineæ* completely submerged to prevent a surface growth and consequent loss of fermentable matter by oxidation. Within about twenty-four hours from the sowing of the mash a microscopical examination will show it to be completely permeated with newly-formed mycelium of the *Mucedineæ*, which has already commenced its work of saccharification of the starch, and now or a short period thereafter the organisms produce spores within the mycelium which will carry on the alcoholic fermentation, so that both processes now proceed together and continue until substantially the whole of the starch has been converted into sugar and the latter into alcohol by fermentation, the completion of the conversions being ascertainable as hereinafter described, the time required being about five days or one hundred and twenty hours.

We have hereinbefore stated that the saccharification and fermentation processes can be materially expedited by the use of a small quantity of a pure ferment culture, as a pure yeast, and by this we mean a ferment free from foreign micro-organisms, and in practice we have used what is known in France as "*Levure gentil;*" but any other equally pure ferment culture or yeast will answer the same purposes.

To the end stated, and about twenty hours after the sowing of the mash with *Mucedineæ* or after the mash has cooled down to about 33° centigrade, we add thereto a little yeast— say about one-tenth of a gram of a pure culture of yeast—and it may here be stated that the introduction into the mash of the *Mucedineæ*, as well as the yeast, should be effected in such manner as will prevent the intrusion of foreign micro-organisms. After introducing the yeast the supply of sterilized air to the mash is stopped, but the latter is preferably kept agitated, and upon examination it will be found that after a few hours the yeast has so far reproduced itself and assisted by the spores in the mycelium as to cause an immensely vigorous fermentation, which is evinced by the torrents of pure carbonic-acid gas coming from the vessel. Inasmuch as this gas carries with it some alcohol, and although the quantity is substantially infinitesimal, yet we prefer to recover it by passing the gas through a body of water. The action now going on in the saccharifying and fermenting vessel is twofold. The yeast and the spores in the mycelium are attacking and breaking up the sugar of the mash into alcohol and carbonic acid, while the *Mucedineæ* are attacking the starch and converting it into sugar, which is seized as fast as formed by the spores formed in the mycelium and by the yeast and broken up, as described, the result being that the conversion of the starch into sugar and the fermentation of the latter are completed in from eighty to ninety hours. The mash is now ready for distillation, this operation yielding four hundred liters of alcohol of 100° or 66.6 liters per one hundred kilograms of starch, a yield which is but a small fraction below the theoretical yield, a result never attained before our invention.

Inasmuch as the condition of the seed or spores of the *Mucedineæ* and the nature of the nutritive elements are absolutely of no importance we include in the term "*Mucedineæ* or cultures thereof" not only the seed or spores proper, but also the chalmydo spores, the conidium, the gemmiferous cells, and mycelian tubes, however produced, so long as they are not made a vehicle of such other deleterious micro-organisms hereinbefore referred to.

Although we have described our invention in relation to the preparation of a mash ready for distillation, we do, of course, not limit ourselves thereto, as it will be obvious to any distiller that the mash may be filtered before distillation and the filtrate distilled; but we prefer to carry out our invention as described, as we thereby avoid the preliminary filtration of the mass and the liability to loss of alcohol. Nor do we confine ourselves to the addition of the yeast to the mash after its permeation by the mycelium, as this may be done at any time after the sowing of the *Mucedineæ*, the temperature of the mash being of course reduced to a degree suitable to the reproduction of the yeast.

From what has been said it will be seen than an almost infinitesimal quantity of culture, as compared with the quantity of mash or wort treated, is used.

After seeding it can readily be ascertained by testing samples of the mash whether the development of the fungi is sufficient to effect the saccharification and fermentation, which development proceeds very rapidly, and when found sufficient the supply of air to the vessel is cut off and the saccharification and fermentation allowed to proceed. The completion of these operations is also readily determined by reacting upon samples of the liquid with iodin, such liquid at the beginning turning blue, then red, and finally remaining unaffected. When fermentation ceases, it will be found that the conversion of the starch has been so complete that the insoluble portions of the grain will not show a trace of starch.

The saccharification and fermentation of the mash may be effected in any suitably-organized apparatus—as, for instance, in apparatus such as shown in the accompanying drawings in sectional elevation, A indicating a vessel provided with a charging-aperture adapted to be hermetically closed by a suitable cover H. The head of the vessel A has a central stuffing-box, through which passes a shaft $b$, provided with stirrer-blades B at its lower end proximate to the bottom of said vessel, said shaft passing also through an internal fluid-tight stuffing box or chamber E, which is preferably filled with a sterilized liquid. From the bottom of vessel A extends a pipe K, connected by a branch M with an air sterilizer and filter N of any well-known construction and containing sterilized wadding, and by a branch L with a source of steam-supply. (Not shown.) From the said head of vessel A extends a pipe P, whose lower end dips into a liquid, said pipe acting as a safety-valve and regulating the pressure within vessel A, which pressure need only be slightly greater than atmospheric pressure to prevent any possible access of ambient air to the interior of said vessel, and F is a branch in the head thereof adapted to be hermetically closed by a screw-cap and to which a flexible tube G can be attached for the introduction of the *Mucedineæ*. The branches L and M of pipe K are provided with suitable stopcocks, so that after the vessel is charged steam can first be admitted thereto, then sterilized air, for the purposes above stated. During the operation of boiling, cooling, sowing of the *Mucedineæ* and subsequent saccharification and fermentation the shaft $b$ is kept in motion, for which purpose it is geared to a driving-shaft S, which carries the usual fast and loose pulleys, as shown.

We will now point out the more salient points involved in our process, the most important of which is the increase in the yield of alcohol to within a fraction of the theoretical yield due to the use of non-pathogenic *Mucedineæ* acting upon a sterilized mash or liquor, we claiming to be the first to saccharify and ferment a mash or liquor to be distilled by the direct agency of non-pathogenic *Mucedineæ* under exclusion of adventitious micro-organisms. The next important step in the process is the fluidification of the starch whereby its practically complete conversion into sugar is rendered possible. The *Mucedineæ* as used in our process propagate very rapidly and fix upon themselves a portion of the soluble constituents of the mash, and particularly the nitrogenous constituents, some of these *Mucedineæ* containing themselves as high as forty-five per cent. of their own weight when dry of nitrogenous constituents, thereby increasing the weight of nourishing properties of the swill or solid insoluble residues by absorption of soluble nitrogenous constituents of the mash.

Inasmuch as all the *Mucedineæ* used are non-pathogenic the residues referred to constitute a valuable food for stock. These fungi are, however, destroyed in the distillation of the mash, and if the latter is filtered prior to distillation the fungi in the residuary material are readily destroyed by heat.

The advantages of our process over all others, irrespective of the great increase in the yield of alcohol, lie in the comparative simplicity and especially in the reduced cost of manufacture. The manufacture of the large quantities of malt required in the so-called "malt" process is avoided. The manufacture of comparatively large quantities of yeast is likewise avoided, as well as the deleterious results inherent to its use, as the lactic, butyric, gummy, and other detrimental fermentations inherent to the malt process.

Although we prefer to use in our process non-pathogenic micro-organisms having the property of saccharifying starch and converting the sugar formed into alcohol by fermentation to avoid injurious effects which may result from the use of the residues of distillation as food for stock, yet we do not desire to limit ourselves to these micro-organisms, as it is obvious that when a pathogenic micro-organism is used and the mash itself distilled said organisms will be destroyed by the heat required to distil the same. On the other hand, if the solid constituents are filtered prior to distillation said residues may, before being used as a food or stock, be heated to such a temperature as to destroy the pathogenic micro-organism.

Having thus described our invention, what we claim as new therein, and desire to secure be Letters Patent, is—

1. In the manufacture of alcohol, the process which consists in preparing a mash of suitable fluidity, sterilizing and then simultaneously saccharifying and fermenting the same under exclusion of adventitious micro-organisms, and after cooling to a suitable temperature, by propagating therein a micro-organism capable of both saccharifying starch and subsequently fermenting it, for the purpose set forth.

2. In the manufacture of alcohol, the process which consists in preparing a mash of suitable fluidity, sterilizing and then simultaneously saccharifying and fermenting the same under exclusion of adventitious micro-organisms and after cooling to a suitable temperature, by propagating therein *Mucedineæ* capable of both saccharifying starch and subsequently fermenting it, for the purpose set forth.

3. In the manufacture of alcohol, the process which consists in preparing a mash of suitable fluidity, sterilizing and then simultaneously saccharifying and fermenting the same under exclusion of adventitious micro-organisms and after cooling to a suitable temperature, by propagating therein *Amylomices Rouxii*, for the purpose set forth.

4. The process which consists in preparing a mash by boiling the starchy material as usual, attenuating and fluidifying the mash by addition thereto of water and of a small quantity of malt, sterilizing the mash so prepared and simultaneously saccharifying and fermenting the same under exclusion of adventitious micro-organisms and after cooling to a sufficient temperature, by propagating therein a micro-organism capable of both saccharifying starch and then fermenting it, for the purpose set forth.

5. The process, which consists of preparing a mash of suitable fluidity, sterilizing and then simultaneously saccharifying and fermenting the same, under exclusion of adventitious micro-organisms and after cooling to a suitable temperature, by propagating therein a micro-organism capable of both saccharifying starch and subsequently fermenting it, and adding to the mash under exclusion of adventitious micro-organisms and before its saccharification and fermentation are completed a small quantity of a pure ferment, as pure yeast.

In testimony whereof we affix our signatures in presence of two witnesses.

AUGUSTE COLLETTE.
    AUGUSTE BOIDIN.

Witnesses:
  ARMAND DEFRANCE,
  HENRI WERREIN.